(12) United States Patent (10) Patent No.: US 12,603,209 B2
Kameno (45) Date of Patent: Apr. 14, 2026

(54) MAGNETIC FIELD GENERATOR AND MOTION CAPTURE SYSTEM USING THE SAME

(71) Applicant: TDK Corporation, Tokyo (JP)

(72) Inventor: Makoto Kameno, Laguna (PH)

(73) Assignee: TDK Corporation, Tokyo (JP)

( * ) Notice: Subject to any disclaimer, the term of this patent is extended or adjusted under 35 U.S.C. 154(b) by 255 days.

(21) Appl. No.: 18/473,699

(22) Filed: Sep. 25, 2023

(65) Prior Publication Data

US 2024/0105375 A1 Mar. 28, 2024

(30) Foreign Application Priority Data

Sep. 26, 2022 (JP) ................................. 2022-152362

(51) Int. Cl.
H01F 7/20 (2006.01)
G01P 13/00 (2006.01)
(52) U.S. Cl.
CPC ................ H01F 7/20 (2013.01); G01P 13/00 (2013.01)
(58) Field of Classification Search
CPC . H01F 7/20; G01P 13/00; G06F 3/011; G06F 3/014; G01B 7/003
See application file for complete search history.

(56) References Cited

U.S. PATENT DOCUMENTS

| | | | |
|---|---|---|---|
| 5,994,837 A | 11/1999 | Willems et al. | |
| 2002/0108446 A1* | 8/2002 | Matsuki ............... | G01D 5/2086 73/866.5 |
| 2020/0272235 A1* | 8/2020 | Ng .......................... | G06F 3/017 |
| 2022/0276074 A1* | 9/2022 | Haseltine ................. | G01D 5/20 |

FOREIGN PATENT DOCUMENTS

| | | | | |
|---|---|---|---|---|
| JP | 04-008342 A | 1/1992 | | |
| JP | H0799724 B2 * | 10/1995 | ............... | H01F 7/20 |
| JP | 2000311047 A * | 11/2000 | | |
| JP | 2007-309690 A | 11/2007 | | |
| JP | 4332254 B2 * | 9/2009 | | |
| JP | 4922504 B2 * | 4/2012 | | |

OTHER PUBLICATIONS

Extended European Search Report issued in the corresponding European patent Application No. 23199330.4 dated Feb. 8, 2024.

* cited by examiner

*Primary Examiner* — Mohamad A Musleh
(74) *Attorney, Agent, or Firm* — Rimon P.C.

(57) ABSTRACT

Disclosed herein is a magnetic field generator that includes a solenoid coil, a soft magnetic body disposed in an inner diameter area of the solenoid coil, and a signal generating part configured to supply an AC signal to the solenoid coil. Since the soft magnetic body is disposed in the inner diameter area of the solenoid coil, the reach of a magnetic field can be significantly expanded as compared with when an air-core coil is used.

17 Claims, 6 Drawing Sheets

MAGNETIC FIELD GENERATOR AND MOTION CAPTURE SYSTEM USING THE SAME

CROSS-REFERENCE TO RELATED APPLICATION

This application claims the benefit of Japanese Patent Application No. 2022-152362, filed on Sep. 26, 2022, the entire disclosure of which is incorporated by reference herein.

BACKGROUND OF THE ART

Field of the Art

The present disclosure relates to a magnetic field generator and a motion capture system using the same and, more particularly, to a magnetic field generator using a solenoid coil and a motion capture system using such a magnetic field generator.

Description of Related Art

JP 04-008342A discloses a system that identifies the position of an object to be detected using a solenoid coil.

However, in the system disclosed in JP 04-008342A, the reach of a magnetic field generated from the solenoid coil is limited, making it difficult to apply this system to a motion capture system and the like.

SUMMARY

It is therefore an object of the present disclosure to provide a magnetic field generator capable of expanding the reach of a magnetic field and a motion capture system using such a magnetic field generator.

A magnetic field generator according to the present disclosure includes a solenoid coil, a soft magnetic body disposed in the inner diameter area of the solenoid coil, and a signal generating part that supplies an AC signal to the solenoid coil.

A motion capture system according to the present disclosure includes the magnetic field generator and a plurality of magnetic sensors configured to detect a magnetic field generated by the solenoid coil and disposed in mutually different spatial positions.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

An object of the present disclosure is to provide a noise suppression sheet having a higher noise suppression effect.

Figure 1:
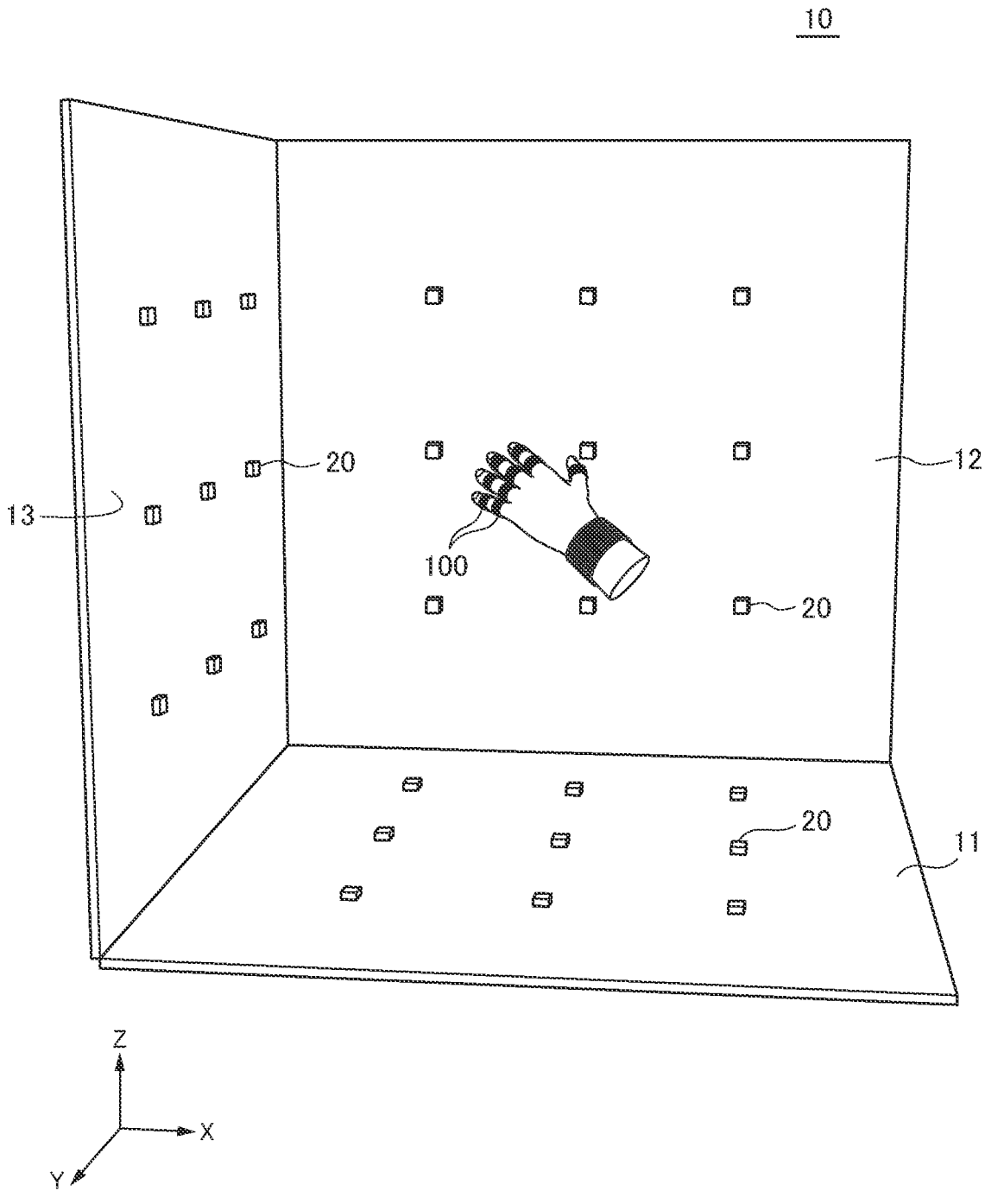
FIG. 1 is a schematic view for explaining the configuration of a motion capture system 10 according to an embodiment of the present disclosure.

FIG. 1 is a schematic view for explaining the configuration of a motion capture system 10 according to an embodiment of the present disclosure.

As illustrated in FIG. 1, the motion capture system 10 according to the present embodiment includes a plurality of magnetic sensors 20 and a plurality of magnetic field generators 100 positioned in a space where the magnetic sensors 20 are arranged. In the example of FIG. 1, the plurality of magnetic sensors 20 are arranged on a wall surface 11 constituting the XY plane, a wall surface 12 constituting the XZ plane, and a wall surface 13 constituting the YX plane, and the plurality of magnetic field generators 100 are positioned in a space surrounded by the wall surfaces 11 to 13. As described above, the plurality of magnetic sensors 20 are arranged at mutually different spatial positions.

Figure 2:
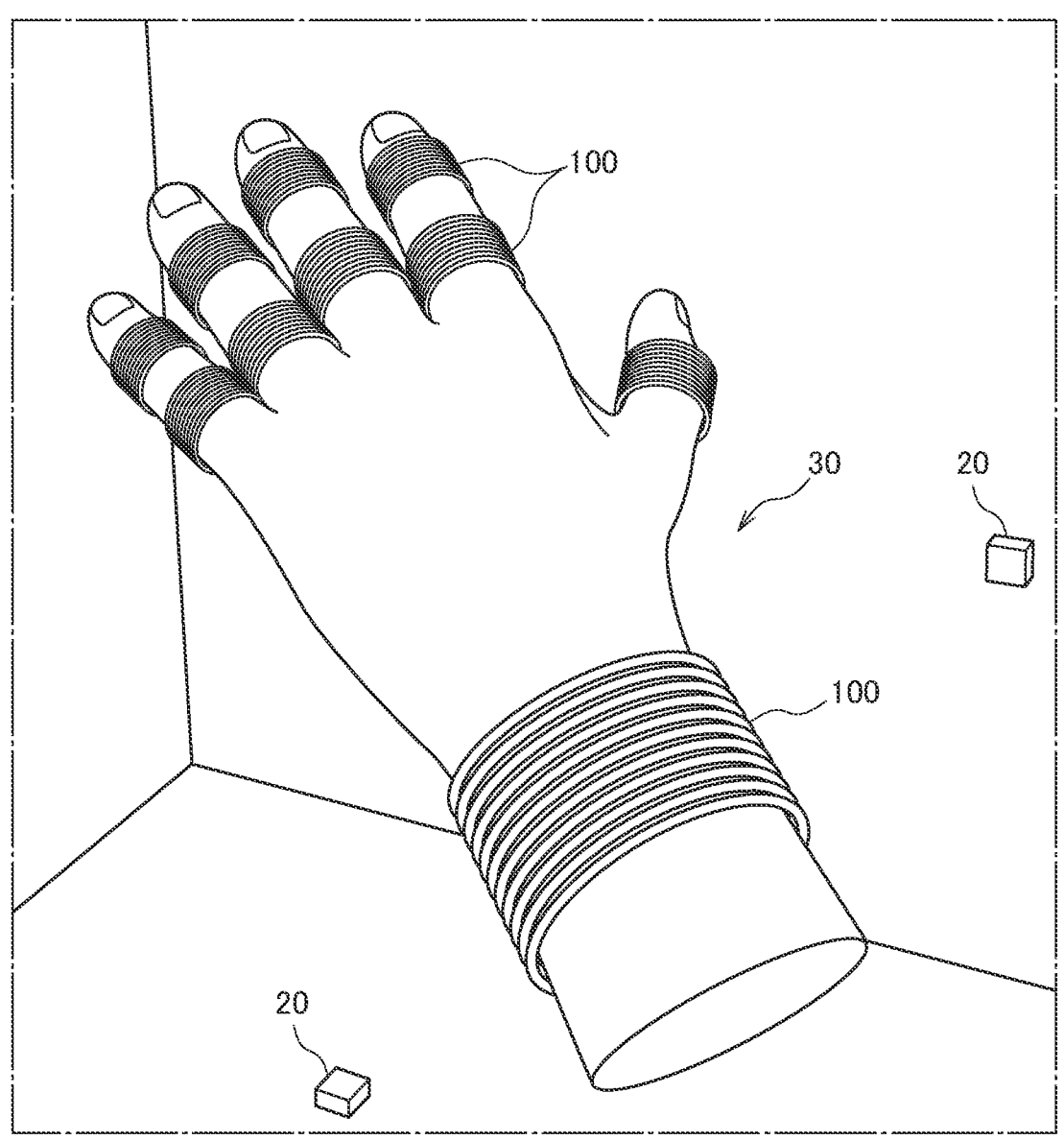
FIG. 2 is a schematic diagram showing an example in which the magnetic field generators 100 are attached to the fingers and wrist of the human body 30.

As illustrated in FIG. 2, the magnetic field generators 100 each have a cylindrical shape wearable on a finger or a wrist of a human body 30, for example. In the example of FIG. 2, one magnetic field generator 100 is worn on the thumb of the human body 30, two magnetic field generators 100 are worn on each of the index, middle, ring, and little fingers, and one magnetic field generator 100 is worn on the wrist. Although the number of the magnetic field generators 100 need not necessarily be plural in the present disclosure, it is preferable to use a plurality of the magnetic field generators 100 in order to detect the motion of a movable part such as a finger.

Figure 3:
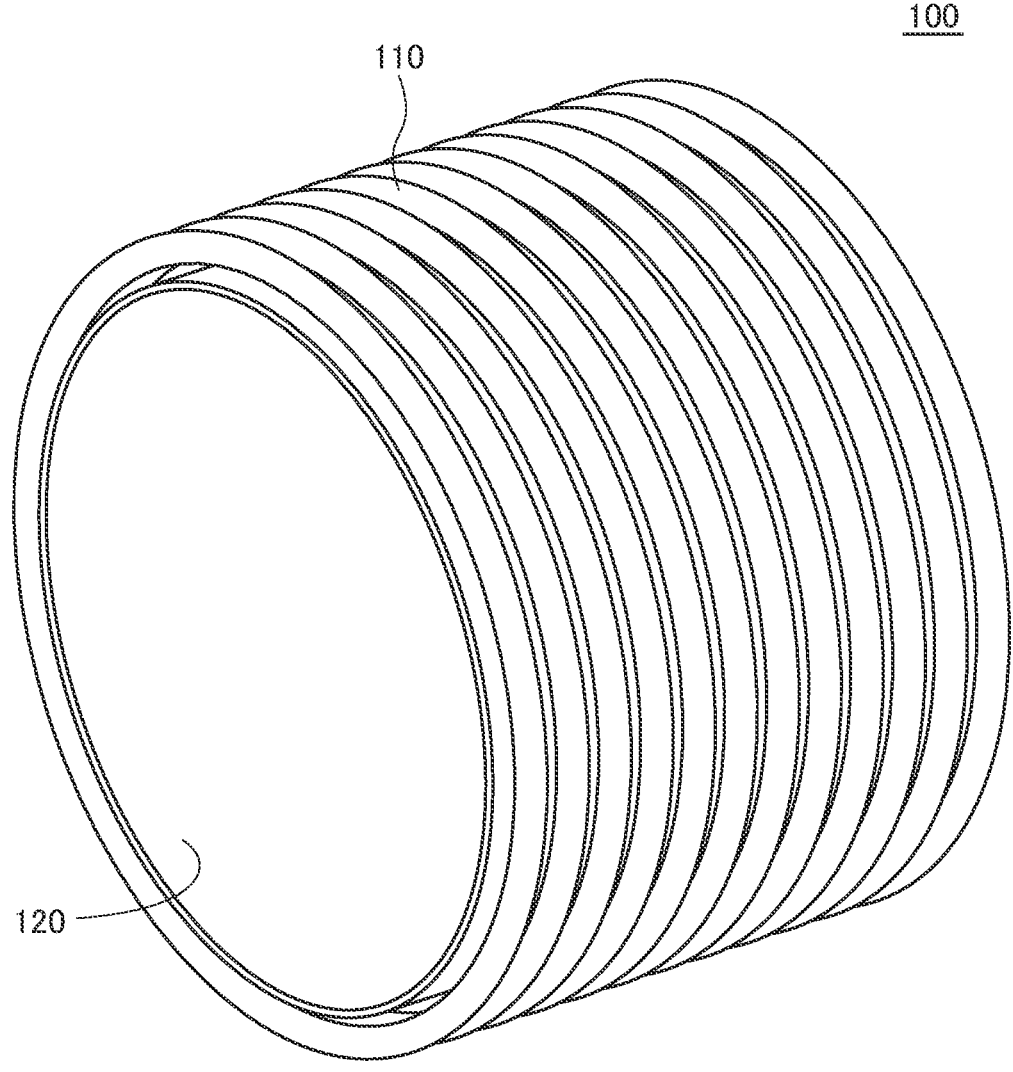
FIG. 3 is a schematic perspective view illustrating the structure of the magnetic field generator 100.

FIG. 3 is a schematic perspective view illustrating the structure of the magnetic field generator 100.

As illustrated in FIG. 3, the magnetic field generator 100 incudes a solenoid coil 110 and a soft magnetic body 120 disposed in the inner diameter area of the solenoid coil 110. The soft magnetic body 120 is made of a high permeability material such as permalloy and has a cylindrical shape disposed along the inner peripheral wall of the solenoid coil 110. This allows the magnetic field generator 100 to be worn on a finger or the like of the human body 30, as illustrated in FIG. 2. For example, when the magnetic field generator 100 is worn on a finger of the human body 30, the soft magnetic body 120 is positioned between the finger and the solenoid coil 110. The soft magnetic body 120 acts to enhance magnetic flux density of a magnetic field generated from the solenoid coil 110 to expand the reach of the magnetic field.

Figure 4:
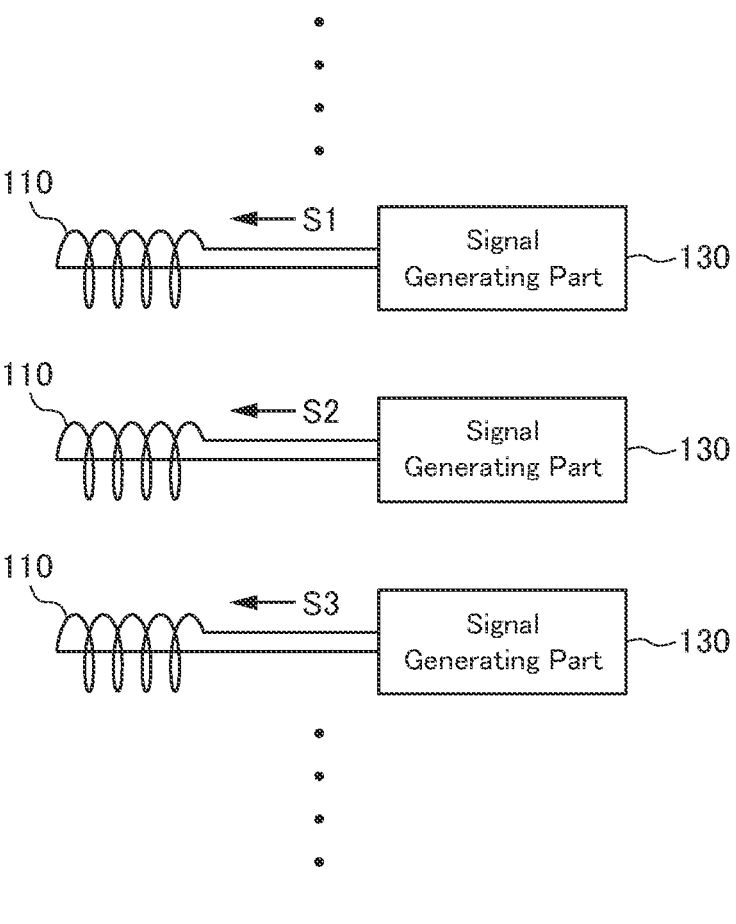
FIG. 4 is a block diagram of the signal generating part 130 connected to the solenoid coil 110.

As illustrated in FIG. 4, the solenoid coil 110 is connected to a signal generating part 130. The signal generating part 130 supplies an AC signal to the solenoid coil 110 to generate an AC magnetic field. When the plurality of magnetic field generators 100 are used simultaneously, the signal generating parts 130 may supply AC signals S1, S2, S3, etc., of mutually different frequencies, respectively, to their corresponding solenoid coils 110. In this case, the plurality of solenoid coils 110 generate AC magnetic fields of mutually different frequencies.

Figure 5:
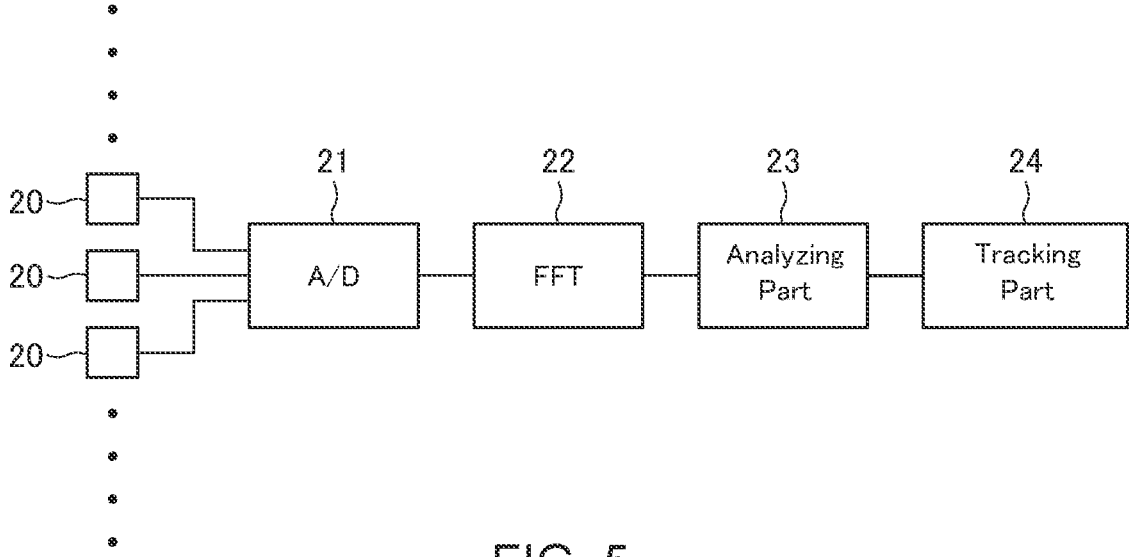
FIG. 5 is a block diagram of a signal processing circuit connected to the magnetic sensor 20.

As illustrated in FIG. 5, the plurality of magnetic sensors 20 are connected to a signal processing circuit including an A-D converter 21, a Fourier transform part 22, an analyzing part 23, and a tracking part 24. The A-D converter 21 acts to convert an analog signal acquired from each of the plurality of magnetic sensors 20 to a digital signal. The Fourier transform part 22 acts to analyze the frequency of an output signal from the A-D converter 21 to divide the output signal into signals corresponding to the individual magnetic field generators 100. The analyzing part 23 acts to identify the positions of the individual magnetic field generators 100 using inverse problem analysis. The tracking part 24 tracks the positions of the individual magnetic field generators 100 to perform 3D motion capture.

Figure 6:
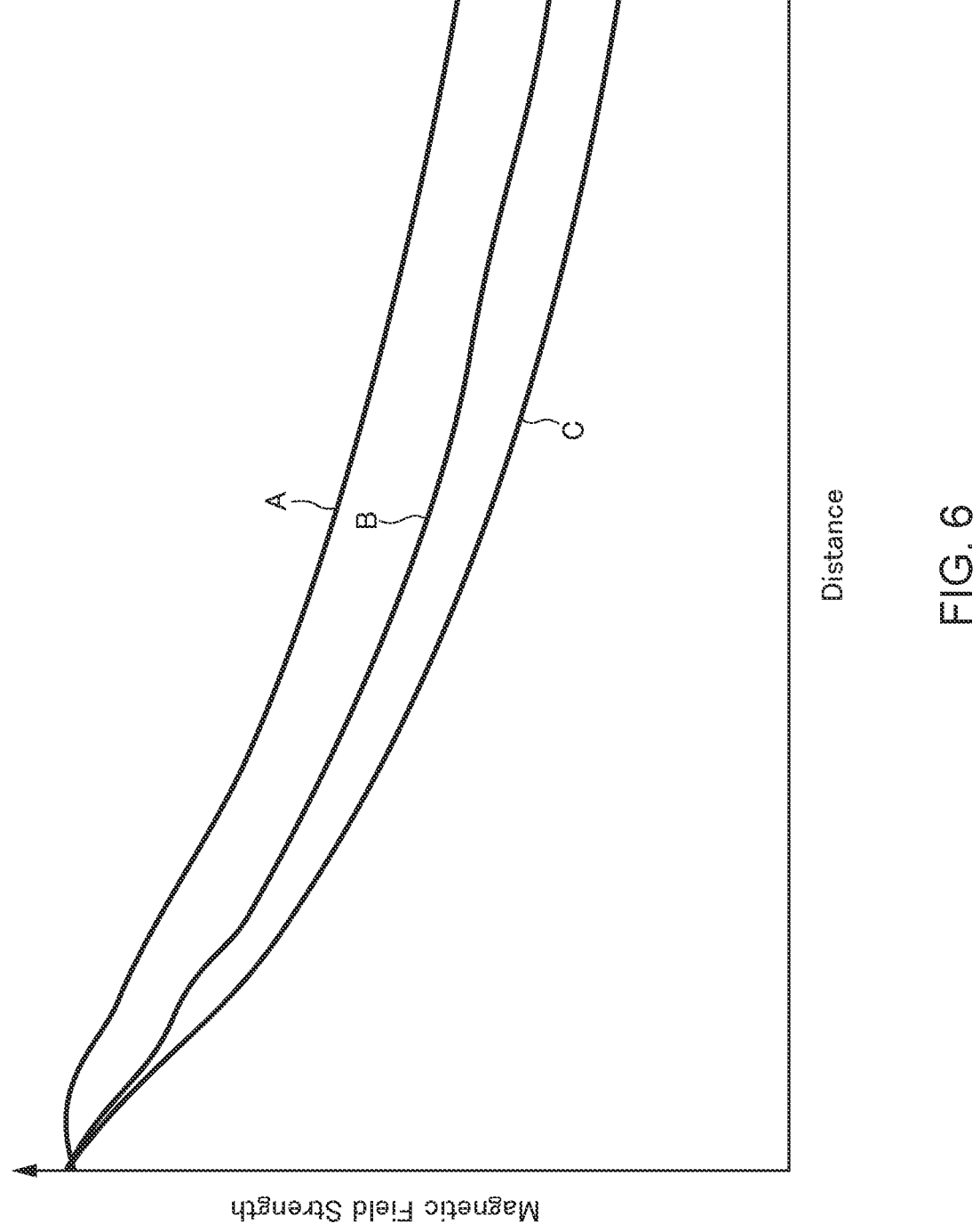
FIG. 6 is a graph illustrating the relation between a distance from the magnetic field generator and magnetic field strength.

FIG. 6 is a graph illustrating the relation between a distance from the magnetic field generator and magnetic field strength. In FIG. 6, the curve A denotes characteristics of the magnetic field generator 100 according to the present embodiment, the curve B denotes characteristics of the magnetic field generator 100 from which the soft magnetic body 120 is removed, and the curve C denotes characteristics of the magnetic field generator 100 in which the soft magnetic body 120 is disposed not in the inner diameter area but in the outer peripheral area thereof.

As can be seen from FIG. 6, the magnetic field generator 100 (curve A) according to the present embodiment can obtain magnetic field strength about three times higher than that when the soft magnetic body 120 is absent (curve B), under the condition of the same distance. From the opposite viewpoint, when the magnetic field generator 100 (curve A) is used, the distance at which the same magnetic field strength can be obtained is about 1.6 times as long as when the soft magnetic body 120 is absent (curve B). When the soft magnetic body 120 is disposed at the outer peripheral area of the solenoid coil 110 (curve C), magnetic field strength to be obtained becomes significantly lower than when the soft magnetic body 120 is absent (curve B).

Figure 7:
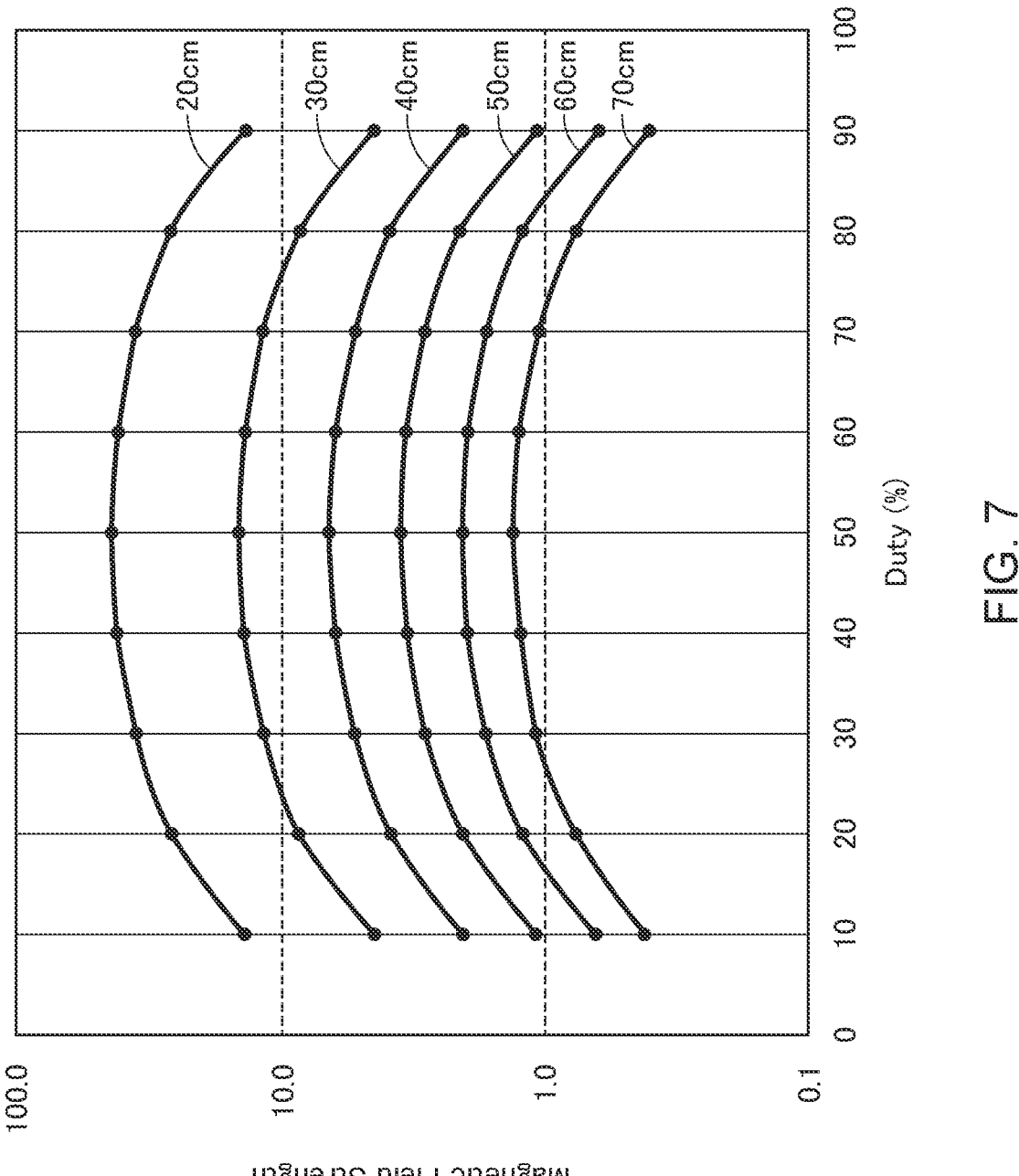
FIG. 7 is a graph illustrating the relation between the duty ratio of the AC signal supplied from the signal generating part 130 to the solenoid coil 110 and magnetic field strength at each distance.

FIG. 7 is a graph illustrating the relation between the duty ratio of the AC signal supplied from the signal generating part 130 to the solenoid coil 110 and magnetic field strength at each distance.

The AC signal supplied from the signal generating part 130 to the solenoid coil 110 is a rectangular wave signal, and as the duty ratio thereof is closer to 50%, a higher magnetic field strength can be obtained, as illustrated in FIG. 7. In a range of duty ratio from 30% or more to 70% or less, a significant difference is not found in the magnetic field strength to be obtained; while when the duty ratio is less than 30% or more than 70%, the magnetic field strength remarkably decreases. Thus, the AC signal to be supplied from the signal generating part 130 to the solenoid coil 110 is preferably a rectangular wave signal with a duty ratio of 30% or more and 70% or less. Although the AC signal to be supplied from the signal generating part 130 to solenoid coil 110 may be a sine wave signal, a rectangular wave signal allows achievement of higher magnetic field strength.

As described above, the motion capture system 10 according to the present embodiment includes the plurality of magnetic sensors 20 and the magnetic field generator 100, and the magnetic field generator 100 includes the solenoid coil 110, the soft magnetic body 120 disposed in the inner diameter area of the solenoid coil 110, and the signal generating part 130 that supplies an AC signal to the solenoid coil 110. With this configuration, the reach of a magnetic field is expanded as compared with when an air-core coil is used to cover a wide area where the magnetic sensors 20 are disposed Thus, the motion capture system 10 according to the present embodiment is suitably used for 3D motion capture of a human body and the like.

While the preferred embodiment of the present disclosure has been described, the present disclosure is not limited to the above embodiment, and various modifications may be made within the scope of the present disclosure, and all such modifications are included in the present disclosure.

The technology according to the present disclosure includes the following configuration examples but not limited thereto.

A magnetic field generator according to the present disclosure includes a solenoid coil, a soft magnetic body disposed in the inner diameter area of the solenoid coil, and a signal generating part that supplies an AC signal to the solenoid coil.

According to the present disclosure, since the soft magnetic body is disposed in the inner diameter area of the solenoid coil, the reach of a magnetic field can be significantly expanded as compared with when an air-core coil is used.

In the present disclosure, the soft magnetic body may have a cylindrical shape disposed along the inner peripheral wall of the solenoid coil. This allows the magnetic field generator to be worn on a finger, a wrist, or the like of a human body.

In the present disclosure, the AC signal may be a rectangular wave signal with a duty ratio of 30% or more and 70% or less. This allows the reach of a magnetic field to be further expanded.

A motion capture system according to the present disclosure includes the magnetic field generator and a plurality of magnetic sensors configured to detect a magnetic field generated by the solenoid coil and disposed in mutually different spatial positions.

According to the present disclosure, the plurality of magnetic sensors are disposed in mutually different spatial positions, thereby allowing the position of the magnetic field generator to be detected.

The motion capture system according to the present disclosure may include a plurality of the magnetic field generators, and the signal generating parts included in the plurality of respective magnetic field generators may supply AC signals of mutually different frequencies. This allows the positions of the plurality of magnetic field generators to be detected.

As described above, according to the present disclosure, there can be provided a magnetic field generator capable of expanding the reach of a magnetic field and a motion capture system using such a magnetic field generator.

What is claimed is:

1. A magnetic field generator comprising:
   a solenoid coil;
   a soft magnetic body disposed in an inner diameter area of the solenoid coil; and
   a signal generating part configured to supply an AC signal to the solenoid coil,
   wherein the soft magnetic body has a cylindrical shape disposed along an inner peripheral wall of the solenoid coil such that a hollow surrounded by the soft magnetic body is formed.

2. The magnetic field generator as claimed in claim 1, wherein the AC signal is a rectangular wave signal with a duty ratio of 30% or more and 70% or less.

3. The magnetic field generator as claimed in claim 1, wherein the hollow has a size that allows a human finger to be inserted therein.

4. The magnetic field generator as claimed in claim 1, wherein the hollow has a size that allows a human wrist to be inserted therein.

5. The magnetic field generator as claimed in claim 1, wherein the soft magnetic body has an outer peripheral wall facing the inner peripheral wall of the solenoid coil and an inner peripheral wall positioned on an opposite side of the outer peripheral wall.

6. A motion capture system comprising:

at least one magnetic field generator including:

a solenoid coil;

a soft magnetic body disposed in an inner diameter area of the solenoid coil; and a signal generating part configured to supply an AC signal to the solenoid coil; and a plurality of magnetic sensors configured to detect a magnetic field generated by the solenoid coil, wherein the soft magnetic body has a cylindrical shape disposed along an inner peripheral wall of the solenoid coil such that a hollow surrounded by the soft magnetic body is formed, and wherein the plurality of magnetic sensors are disposed in mutually different spatial positions.

7. The motion capture system as claimed in claim 6, wherein a plurality of the magnetic field generators are provided, and wherein each magnetic field generator includes a respective signal generating part configured to supply an AC signal to the solenoid coil, and wherein each signal generating part is configured to supply an AC signal having a frequency different from that of the other signal generating parts.

8. The motion capture system as claimed in claim 6, further comprising a signal processing circuit connected in common to the plurality of magnetic sensors.

9. The motion capture system as claimed in claim 6, wherein the plurality of magnetic sensors include a plurality of first magnetic sensors, and wherein the plurality of first magnetic sensors are arranged on a first wall surface.

10. The motion capture system as claimed in claim 9, wherein the plurality of magnetic sensors further include a plurality of second magnetic sensors, and wherein the plurality of second magnetic sensors are arranged on a second wall surface perpendicular to the first wall surface.

11. The motion capture system as claimed in claim 10, wherein the plurality of magnetic sensors further include a plurality of third magnetic sensors, and wherein the plurality of third magnetic sensors are arranged on a third wall surface perpendicular to the first and second wall surfaces.

12. A motion capture system comprising:

a plurality of magnetic field generators each including a solenoid coil, a soft magnetic body disposed in an inner diameter area of the solenoid coil, and a signal generating part configured to supply an AC signal to the solenoid coil; and a plurality of magnetic sensors configured to detect a magnetic field generated by the solenoid coil included in each of the plurality of magnetic field generators, wherein the plurality of magnetic field generators include first and second magnetic field generators, wherein the signal generating part included in the first magnetic field generator is configured to supply the AC signal having a first frequency, and wherein the signal generating part included in the second magnetic field generator is configured to supply the AC signal having a second frequency different from the first frequency.

13. The motion capture system as claimed in claim 12, wherein the plurality of magnetic field generators further include a third magnetic field generator, and wherein the signal generating part included in the third magnetic field generator is configured to supply the AC signal having a third frequency different from the first and second frequencies.

14. The motion capture system as claimed in claim 12, wherein the soft magnetic body included in each of the plurality of magnetic field generators has a cylindrical shape disposed along an inner peripheral wall of the solenoid coil such that a hollow surrounded by the soft magnetic body is formed.

15. The motion capture system as claimed in claim 12, wherein a hollow surrounded by the soft magnetic body included in the first magnetic field generator has a size that allows a human finger to be inserted therein.

16. The motion capture system as claimed in claim 15, wherein a hollow surrounded by the soft magnetic body included in the second magnetic field generator has a size that allows a human wrist to be inserted therein.

17. The motion capture system as claimed in claim 12, further comprising a signal processing circuit connected in common to the plurality of magnetic sensors.

* * * * *